(12) United States Patent
Dubov

(10) Patent No.: US 11,940,339 B2
(45) Date of Patent: Mar. 26, 2024

(54) EMBEDDED STRUCTURAL HEALTH MONITORING SYSTEMS FOR BUILDING STRUCTURES CREATED BY ADDITIVE PROCESSES

(71) Applicant: Mighty Buildings, Inc., San Francisco, CA (US)

(72) Inventor: Aleksei Dubov, Moscow (RU)

(73) Assignee: Mighty Buildings, Inc., Oakland, CA (US)

( * ) Notice: Subject to any disclaimer, the term of this patent is extended or adjusted under 35 U.S.C. 154(b) by 419 days.

(21) Appl. No.: 17/129,884

(22) Filed: Dec. 21, 2020

(65) Prior Publication Data

US 2022/0196491 A1 Jun. 23, 2022

(51) Int. Cl.
| | | |
|---|---|---|
| *G01L 1/20* | (2006.01) | |
| *G01L 1/22* | (2006.01) | |
| *G01L 5/16* | (2020.01) | |

(52) U.S. Cl.
CPC ............... *G01L 1/205* (2013.01); *G01L 1/22* (2013.01); *G01L 5/16* (2013.01)

(58) Field of Classification Search
CPC ..................................................... G01L 1/205
See application file for complete search history.

(56) References Cited

U.S. PATENT DOCUMENTS

| | | |
|---|---|---|
| 2006/0243056 A1 | 11/2006 | Sundermeyer et al. |
| 2012/0297888 A1 | 11/2012 | Nagarajan et al. |
| 2015/0278414 A1* | 10/2015 | Zhou .................. G06F 30/23 703/2 |
| 2016/0091388 A1 | 3/2016 | De Baere |
| 2017/0160243 A1* | 6/2017 | Zhang ............... G01N 29/2412 |

(Continued)

FOREIGN PATENT DOCUMENTS

SU 563559 A * 7/1977

OTHER PUBLICATIONS

Smith et al. "Structural Health Monitoring of 3D Printed Structures," Dec. 1, 2018. <https://www.osti.gov/biblio/1493145>.

(Continued)

*Primary Examiner* — Hyun D Park
(74) *Attorney, Agent, or Firm* — Cognition IP, P.C.; Edward Steakley; Justin White

(57) ABSTRACT

Structural health monitoring systems for building structures created by additive processes can include at least an orientation sensing subsystem, a strain sensing subsystem, and a local processor. Orientation sensors can collect data from a first set of strategic locations and strain gauges can collect data from a second set of strategic locations on a 3D-printed building component. The sensors can be embedded during or after the 3D-printing process. A simulation engine can determine the strategic locations by modeling 3D geometry and material properties and simulating results from the application of various loads to determine the likely structural failure locations of the building component. The local processor can receive sensor data, filter the data, format the data for analysis, store the data, and forward the formatted data to a remotely located processing system for analysis. Additional system components can include an environmental subsystem and tensometers to collect humidity, temperature, and material deformation data.

23 Claims, 12 Drawing Sheets

(56) References Cited

U.S. PATENT DOCUMENTS

| | | | |
|---|---|---|---|
| 2017/0167932 A1* | 6/2017 | Donskoy | G01M 5/0041 |
| 2018/0177512 A1* | 6/2018 | Hogan | A61B 17/158 |
| 2018/0205905 A1* | 7/2018 | Hammar | G09B 9/042 |
| 2020/0066067 A1* | 2/2020 | Herman | G07C 5/0808 |
| 2020/0080920 A1 | 3/2020 | Chattopadhyay et al. | |
| 2020/0088593 A1 | 3/2020 | Mullen | |
| 2021/0396012 A1* | 12/2021 | Memari | C04B 18/146 |

OTHER PUBLICATIONS

Fprimec, "Sensors for Structural Health Monitoring," Jan. 6, 2020 . [retrieved on Feb. 17, 2022], Retrieved from the Internet: <URL:https://www.fprimec.com/sensors-for-structural-health-monitoring/>.

\* cited by examiner

EMBEDDED STRUCTURAL HEALTH MONITORING SYSTEMS FOR BUILDING STRUCTURES CREATED BY ADDITIVE PROCESSES

TECHNICAL FIELD

The present disclosure relates generally to buildings, and more particularly to the structural integrity of building components and structures.

BACKGROUND

Structural health assessment or monitoring systems are widely applied to various forms of buildings and structures, such as skyscrapers and bridges. Existing technologies for monitoring the structural integrity of buildings and structures are relatively expensive, and as such are typically only used in the high-rise commercial, industrial, or infrastructure sectors where structural problems can cause dramatic losses. Such technologies can be complex, with increasing stages of difficulty that require progressive knowledge of previous stages. Such stages can include, for example, detecting the existence of damage on a building or structure, locating the damage, identifying the types of damage, and quantifying the severity of the damage. Existing structural integrity monitoring techniques normally include manual inspection with very expensive equipment and/or customized integrated systems that can require manual measurements by skilled workers and complex post-measuring analytics.

Structural integrity monitoring is usually less important for residential and commercial structures of low-rise buildings since structural issues in this sector tend to be less catastrophic, can typically be monitored by tenants, and the costs of traditional structural integrity monitoring systems can be prohibitive. Newer additive manufacturing methods such as three-dimensional ("3D") printing to form buildings and building components give rise to unique issues, however, which issues can benefit from structural integrity monitoring. Such issues can include, for example, concerns over 3D printing materials used, curved regions and other unique features that are only possible using 3D printing techniques, and transportation of 3D printed buildings and building components. While many structural integrity monitoring components and methods can be expensive, the repetitive nature of forming many identical or similar 3D printed buildings and building components may help in lowering overall costs over time.

Although traditional ways of monitoring the structural integrity of structures and buildings have worked well in the past, improvements are always helpful. In particular, what is desired are low-cost structural health monitoring systems and methods adapted for use for buildings and building components created by additive processes, such as 3D printing.

SUMMARY

It is an advantage of the present disclosure to provide low-cost structural health monitoring systems for buildings and building components created by additive processes. The disclosed features, apparatuses, systems, and methods provide improved structural health monitoring solutions that involve the use of lower cost sensors and system components that can be placed at various strategic locations on a 3D printed building component to facilitate improved structural monitoring at reduced costs. These advantages can be accomplished in multiple ways, such as by modeling the 3D printed building component and performing failure analysis to determine the strategic sensor locations, embedding the sensors, and automatically collecting and formatting sensor data and forwarding the data to a remote processing system.

In various embodiments of the present disclosure, a structural health monitoring system can include at least an orientation sensing subsystem, a strain sensing subsystem, and a local central processing unit. The orientation sensing subsystem can include an orientation data processing unit coupled to a plurality of orientation sensors and an orientation subsystem interface. The plurality of orientation sensors can be located at and collect orientation data from a first set of strategic locations on a building component formed by an additive process. The strain sensing subsystem can include a strain data processing unit coupled to a plurality of strain gauges and a strain subsystem interface. The plurality of strain gauges can be located at and collect strain data from a second set of strategic locations on the building component. The local central processing unit can be located at or proximate the building component and can be coupled to the orientation subsystem interface and the strain subsystem interface. The local central processing unit can be configured to receive orientation data from the orientation data processing unit and strain data from the strain data processing unit, filter the received data, arrange the filtered data into a format suitable for data analysis, and provide the formatted data to a remotely located processing system for data analysis. The local central processing unit can also be configured to store data locally at any time for providing the data later to the remotely located processing system.

In various detailed embodiments, the building component can be formed by a 3D printing process. Also, the remotely located processing system can be configured to analyze the formatted data for issues relating to structural failure of the building component and provide an output to a user regarding the analyzed data. The structural health monitoring system can also include the remotely located processing system in some arrangements. In addition, the first and second sets of strategic locations can be determined using a simulation engine configured to determine likely structural failure locations of the building component. This can be done by modeling the three-dimensional geometry and material properties of the building component and simulating results from the application of various loads on the building component. The first set of strategic locations can be where orientations of the building component are most likely to change and the second set of strategic locations can be where the greatest amounts of strain are most likely to be experienced due to future application of actual loads on the building component. The structural health monitoring system can also include the simulation engine in some arrangements.

In various additional detailed embodiments, at least some of the plurality of orientation sensors and the plurality of strain gauge sensors can embedded within additive material of the building component. This can be accomplished during and/or after the additive formation of the building component for some or all of the sensors. Also, additive formation of the building component can include providing one or more recesses within the additive material for placement of one or more of the orientation sensors and strain gauge sensors. In various embodiments, at least some of the plurality of orientation sensors and the plurality of strain gauge sensors can be removable from the structural health monitoring system, such as for purposes of maintenance and/or replacement.

In some arrangements, the structural health monitoring system can also include an environmental subsystem, one or more tensometers, or both. The environmental subsystem can include an environmental processing unit coupled to one or more environmental sensors and an environmental subsystem interface, and the environmental sensor(s) can collect humidity and temperature data at the building component while the environmental processing unit provides the humidity and temperature data to the local central processing unit via the environmental subsystem interface. The one or more tensometers can be located at a third set of strategic locations on the building component and can provide input to the local central processing unit regarding material deformation at the third set of strategic locations. In some arrangements, one or more of the environmental sensors can be detachable, such as for maintenance or replacement. In various embodiments, the formatted data can be provided to the remotely located processing system while the building component is being transported to a building location, while the building component is installed at the building location after being transported to the building location, or both. Data can also be stored locally for later transfer to a processing system.

In further embodiments of the present disclosure, a structural health monitoring system can include at least an orientation sensing subsystem, a strain sensing subsystem, an environmental subsystem, one or more tensometers, and a local central processing unit. Various details and features of these system items can be selected from the foregoing embodiments. The system can also include a simulation engine and a remotely located processing system, such as those set forth above. Formatted collected data can be provided from the local central processing unit to the remotely located processing system while the building component is being transported to a building location, and additional formatted collected data can be provided to the remotely located processing system while the building component is installed at the building location after being transported to the building location.

In still further embodiments of the present disclosure, methods of monitoring the structural health of a building component formed by an additive process are provided. Pertinent method steps can include collecting orientation data from a plurality of orientation sensors located at a first set of strategic locations on a building component formed by an additive process, collecting strain data from a plurality of strain gauges located at a second set of strategic locations on the building component, filtering automatically by a processor the collected orientation data and strain data, arranging automatically by a processor the filtered data into a format suitable for data analysis, providing the formatted data to a data analysis processing system, analyzing automatically by the data analysis processing system the formatted data for issues relating to structural failure of the building component, and providing to a user an output regarding the analyzed data. Additional method steps can include modeling the 3D geometry and material properties of the building component using a simulation engine, simulating results from the application of various loads on the building component using the simulation engine, and determining the first set of strategic locations and second set of strategic locations based on the simulated results from the simulation engine.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems, and methods for structural health monitoring systems for buildings and building components created by additive processes. These drawings in no way limit any changes in form and detail that may be made to the disclosure by one skilled in the art without departing from the spirit and scope of the disclosure.

DETAILED DESCRIPTION

Figure 1:
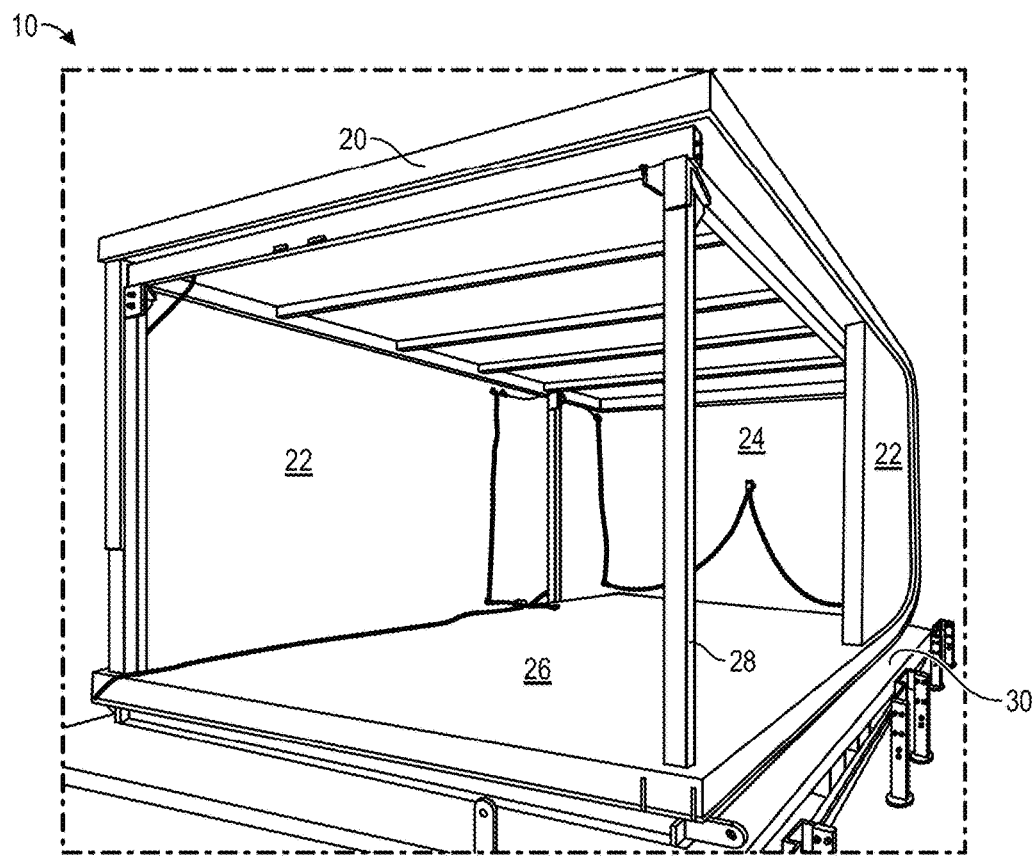
FIG. 1 illustrates in front perspective view an example 3D printed structure.

Example applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for relatively low-cost structural health monitoring systems for buildings and building components. The disclosed embodiments can be used in residential or commercial structures having building components formed by additive manufacturing methods such as 3D printing. In particular, the disclosed systems and methods can be designed to identify anomalies in the structural and thermal performance of designated additive formed building components by taking into account issues related to additive nature of manufacturing methods, such as stress, strain, warpage, layer separation/debonding, weak infill areas, dimensional accuracy, and the like. The disclosed systems can monitor structural performance and stability of the structure to predict common construction issues related to the nature of the additive formed building components based on prior simulation calculations. In general, a simulation engine can model a given building structure and identify critical locations on the building structure for sensor placements, a local processor can collect and format data from the placed sensors, and a remotely located processing system can receive and analyze the formatted collected data.

In various arrangements, which are merely illustrative and non-limiting in nature, the disclosed systems and methods can monitor and track structural performance, deformations, and other issues of building components during the additive formation process of the building component. These can include, for example, relaxation analysis after 3D printing or coating, and monitoring and analysis can take place before or after post-processing of the 3D printing.

In various detailed examples, which are merely illustrative and non-limiting in nature, the disclosed systems and methods can monitor and track structural performance, deformations, and other issues of building components formed by additive processes during the transportation of the building components from a factory to a construction site. This approach can reduce the amount of work required to adjust building components and modules at the construction site to fit original building designs. The disclosed systems and methods can also monitor and track structural changes in the overall building health after installation at the construction site by providing continuous data collection and analysis after construction. Data can be fed into a digital twin model of finite element model, for example, which can perform predictive analysis and provide proactive alerts about preventive maintenance to ensure the safety of the installed 3D printed building component or structure.

Overall System

In general, the disclosed health monitoring systems can perform a variety of valuable functions. These can include, but are not limited to: identifying volumetric shrinkage of 3D printed structures, identifying creep in printed materials, validating correlations between outer surface and inner temperatures of printed materials, identifying correlations between outer/inner surface temperatures and internal stresses between printed layers, and identifying structural and geometrical impacts of post-processing operations such as coating, surface milling, foam pouring, and the like. Some or all of the functions performed by the disclosed health monitoring systems can be performed during production of the building component, transport of the building component, and/or after final installation of the building component. Other valuable functions relating specifically to the health monitoring of printed building materials and components may also be realized through using the disclosed systems and methods, as will be readily apparent to those of skill in the art.

Referring first to FIG. 1, an example 3D printed structure is illustrated in front perspective view. 3D printed structure 10 can include, for example, a ceiling 20, one or more straight wall portions 22, a curved wall portion 24, and a floor 26, all of which can be formed by way of a 3D printing process. 3D printed structure 10 may also include one or more structural supports 28 and/or other components not formed by way of 3D printing. Other structural components and features may also be present in a given structure or building component, and it will be understood that the disclosed structural health monitoring systems and components therefor can be adjusted and/or extrapolated to apply to a wide variety of different structures and building components formed by additive processes. In some arrangements, 3D printed structure 10 can be set for transport, such as on a transportation support or unit 30. Since a 3D printed structure or other building component formed by an additive process may need to be moved from its place of manufacture to a final building location, such a transportation support or unit 30 may often be used. Accordingly, some form of structural health monitoring may be useful in tracking any problems encountered during transportation in addition to after final building construction.

Figure 2:
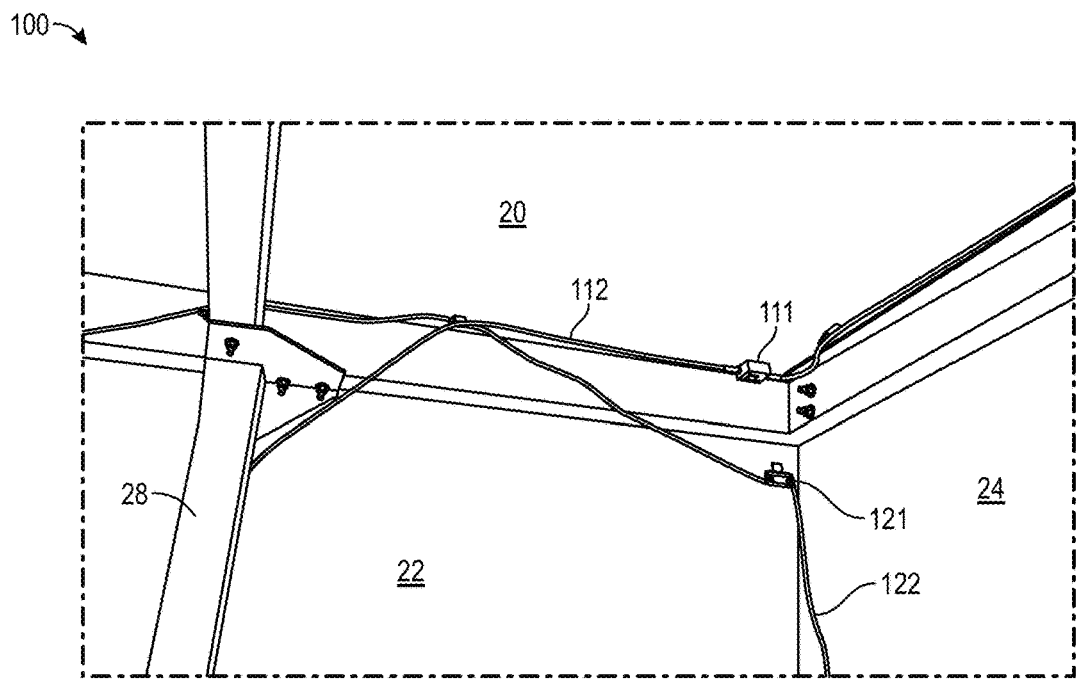
FIG. 2 illustrates in side perspective view portions of an example structural health monitoring system installed at the 3D printed structure of FIG. 1 according to one embodiment of the present disclosure.

FIG. 2 illustrates in side perspective view portions of an example structural health monitoring system installed at the 3D printed structure of FIG. 1. Various components and component types can be used for an overall structural health monitoring system 100 to monitor and track structural health issues both during transport and after installation at a final building location. It will be readily appreciated that not all components and component types are required for every structural health monitoring system, and that some systems may operate without every example component disclosed herein.

Again, 3D printed structure 10 can include a ceiling 20, straight wall portion 22, curved wall portion 24, and structural support 28, among other various building structural features. Components of an overall structural health monitoring system 100 installed at 3D printed structure 10 can include, but are not limited to, for example, an orientation sensor 111 that can be coupled to a system processor (not shown) by way of orientation sensor wiring 112, as well as a strain gauge 121 that can also be coupled to the system processor by way of strain gauge wiring 122. Other sensors and components may also be present, and sensors can be placed at strategic locations at the 3D printed structure, as set forth in detail below.

Figure 3:
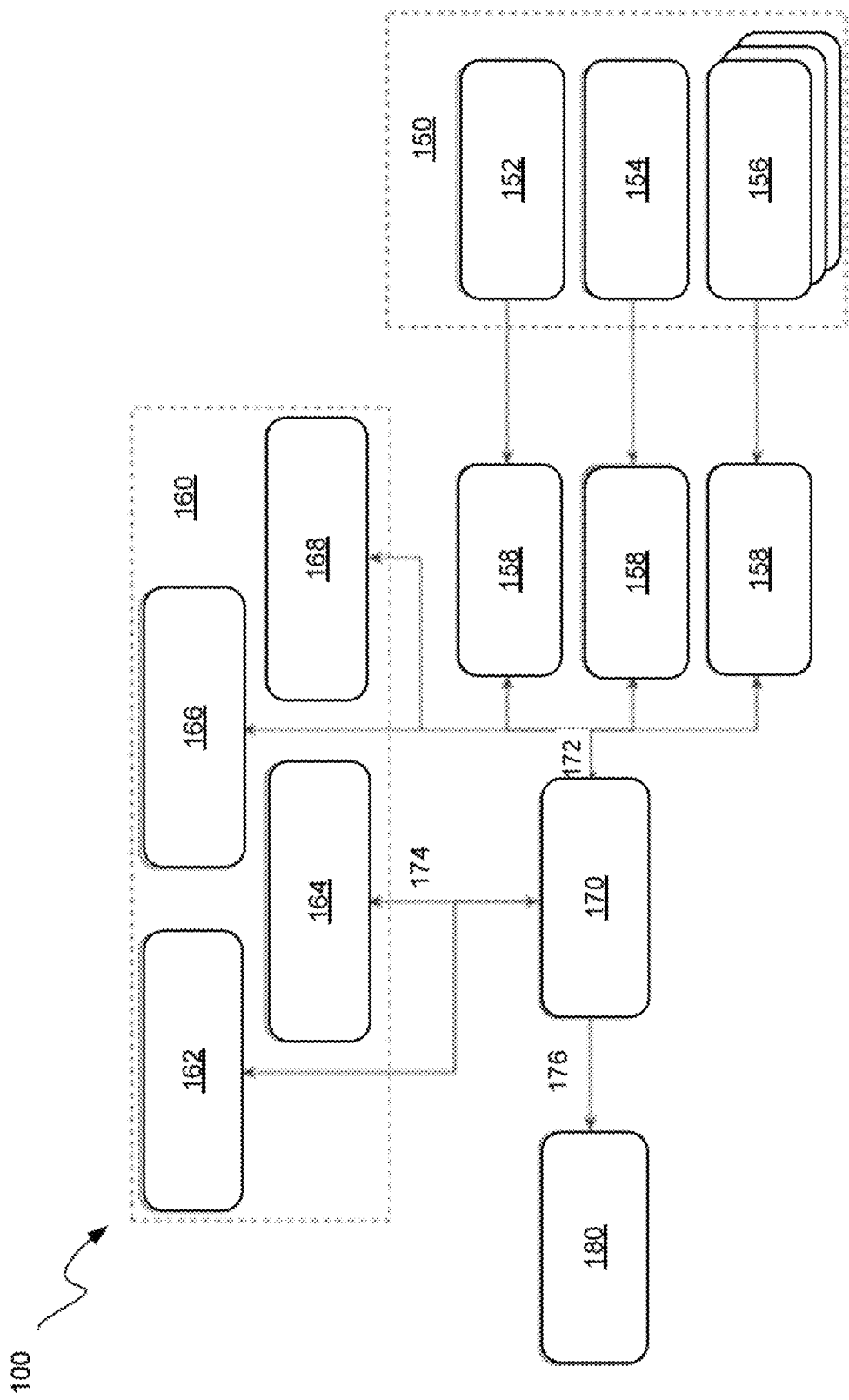
FIG. 3 illustrates a block diagram of an example structural health monitoring system according to one embodiment of the present disclosure.

Continuing with FIG. 3, a block diagram of an example structural health monitoring system is provided. Structural health monitoring system 100 can include various sensor subsystems, individual sensors, one or more localized processors, and one or more remotely located processing servers or systems, among other possible components. Regardless of its exact composition and arrangement of system components, structural health monitoring system 100 can serve to monitor and track structural changes in overall building health during production, during transport, and/or after installation at a construction site. This can be done by providing continuous data collection and analysis at any desired time, such as during transport, after final installation, or both. Data can be fed into a digital twin model of finite element model, for example, which can perform predictive analysis and provide proactive alerts about preventive maintenance to ensure the safety of the transported and/or installed 3D printed building component or structure.

In the example provided here for purposes of illustration, structural health and monitoring system 100 can have a set of analog sensors 150, a set of digital sensors 160, a localized CPU board 170, and a remotely located PC or server 180, among other possible items. The localized CPU board 170 can function as a local system interrogator and/or data interpreter that forwards data for remote processing and analysis. Analog sensors can include, but are not limited to, for example, one or more vibration sensors 152, one or more accelerometers 154, and one or more tensometers 156. Each analog sensor can be coupled to an analog to digital converter ("ADC") 158, which in turn provides a signal to the localized CPU board 170. Digital sensors can include, but are not limited to, for example, one or more accelerometers 162, one or more temperature sensors 164, one or more multisensors (e.g., accelerometer, gyroscope, and/or magnetic) 166, and one or more environmental sensors 168. Again, the various sensors can be placed strategically in predefined locations that can be identified during an initial design and engineering stage. Some sensors and ADCs may be coupled to the localized CPU board 170 by way of a serial peripheral interface 172, while other sensors may be coupled by way of an I2C bus 174. A TCP/IP connection 176 may couple the localized CPU board 170 to the remotely located PC or server 180. Other connection arrangements are also possible.

Figure 4A:
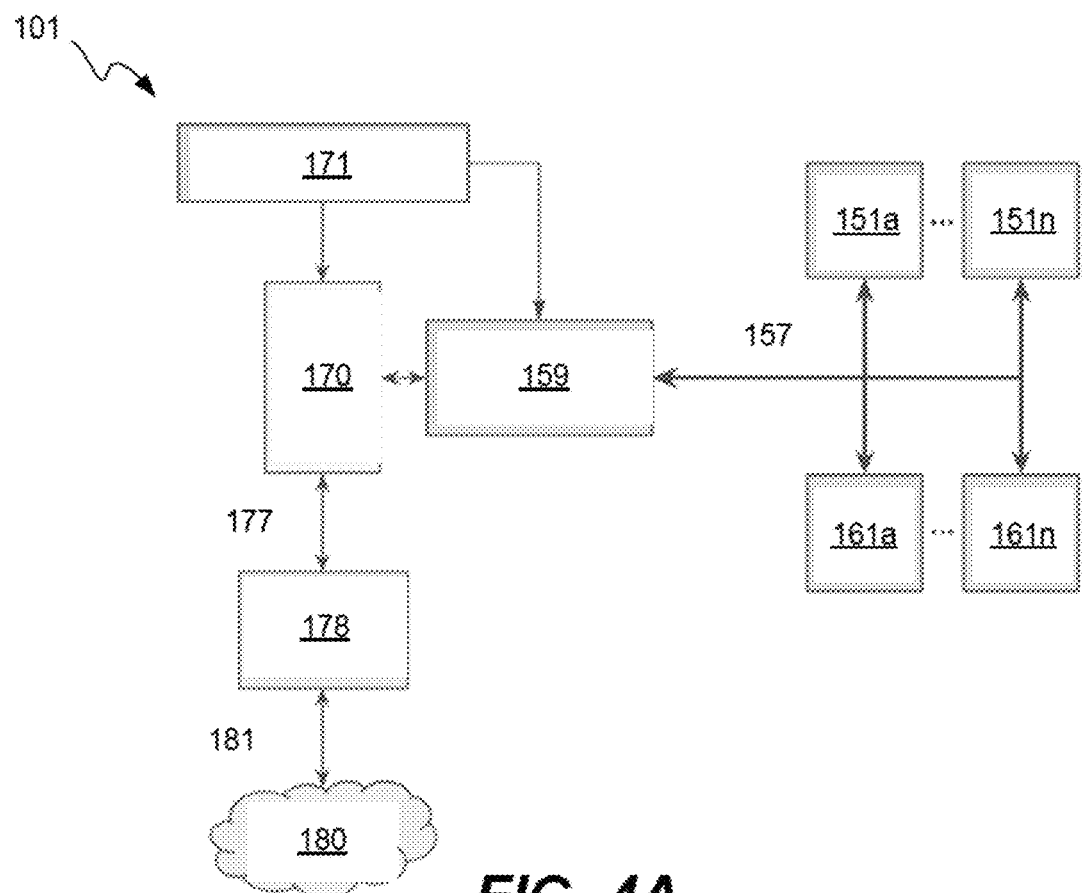
FIG. 4A illustrates a block diagram of an example wired system connection arrangement for a structural health monitoring system according to one embodiment of the present disclosure.

FIG. 4A illustrates a block diagram of an example wired system connection arrangement for a structural health monitoring system. Wired system connection arrangement 101 can include a localized CPU board 170 that can function as a local system interrogator and/or data interpreter that forwards data for remote processing and analysis. CPU board 170 can be coupled to a power supply 171 that may also power an interface converter 159, from which wired connections 157 for data and power can exist to various sensors 151a-151n and 161a-161n. CPU board 170 can be coupled to a local router 178 by way of connection 177, which can be WiFi or Ethernet, for example, and local router 178 can be coupled to a remotely located server 180, such as by way of an Ethernet connection 181. CPU board 170 can be configured to store data locally at any time for providing the data later to the remotely located server 180. In some arrangements, data analysis may be performed locally by a connectable system (not shown) rather than by the remotely located server 180.

Figure 4B:
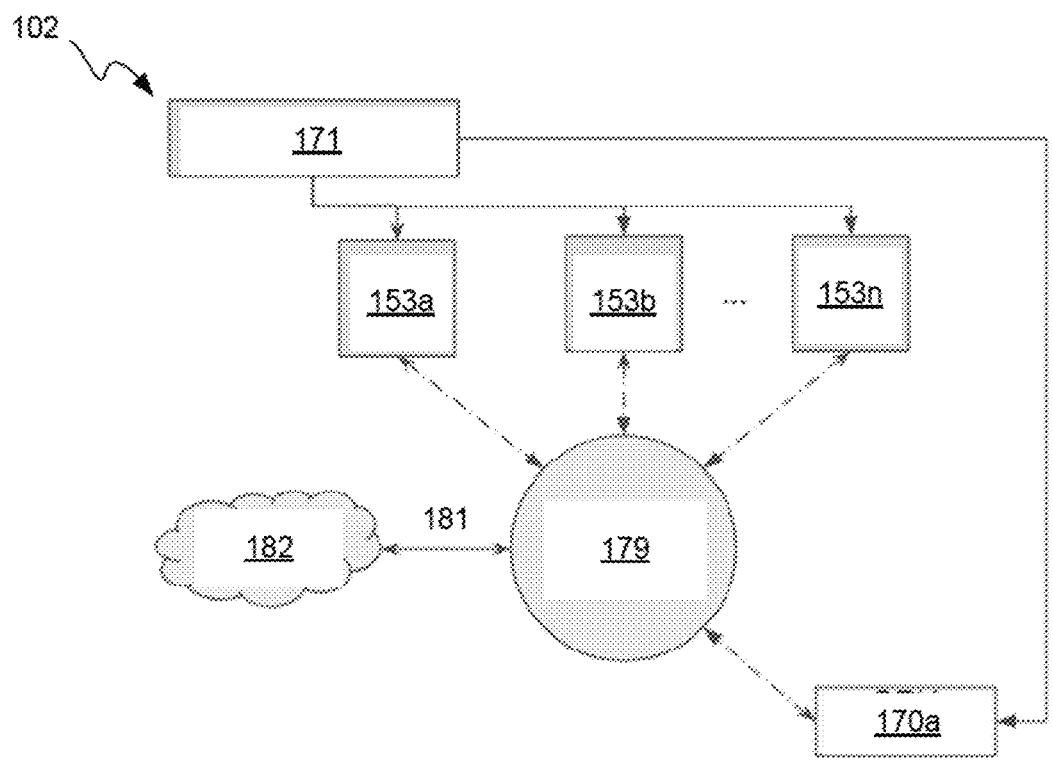
FIG. 4B illustrates a block diagram of an example wireless system connection arrangement for a structural health monitoring system according to one embodiment of the present disclosure.

Alternatively, FIG. 4B illustrates a block diagram of an example wireless system connection arrangement for a structural health monitoring system. Wireless system connection arrangement 102 can include a wireless capable localized CPU board 170a and multiple wireless capable sensors 153a-153n, all of which can be powered by power supply 171, and all of which can communicate via a wireless router 179. Remote communications can be made through cloud 182 by way of, for example, an Ethernet connection 181 between the wireless router 179 and the cloud 182. A remotely located server (not shown) can also communicate via cloud 182. The localized CPU board 170a can be configured to store data locally at any time for providing the data later to the remotely located server. In some arrangements, data analysis may be performed locally by a connectable system (not shown) rather than by the remotely located server. Various alternative arrangements can combine different portions of wired system connection arrangement 101 and wireless system connection arrangement 102 as may be desired.

Orientation Sensing Subsystem

In various arrangements, it will be appreciated that multiple sensors of the same or similar types can be used to obtain readings or measurements at multiple critical points of a structure or building component formed by an additive process. Many orientation sensors and strain gauges, for example, can all be used across a building component at different strategic locations. It can be advantageous to utilize subsystems that include many or all of the same types of sensors across an overall structural health monitoring system. One such subsystem can involve an orientation sensing subsystem that includes many different orientation sensors.

Figure 5:
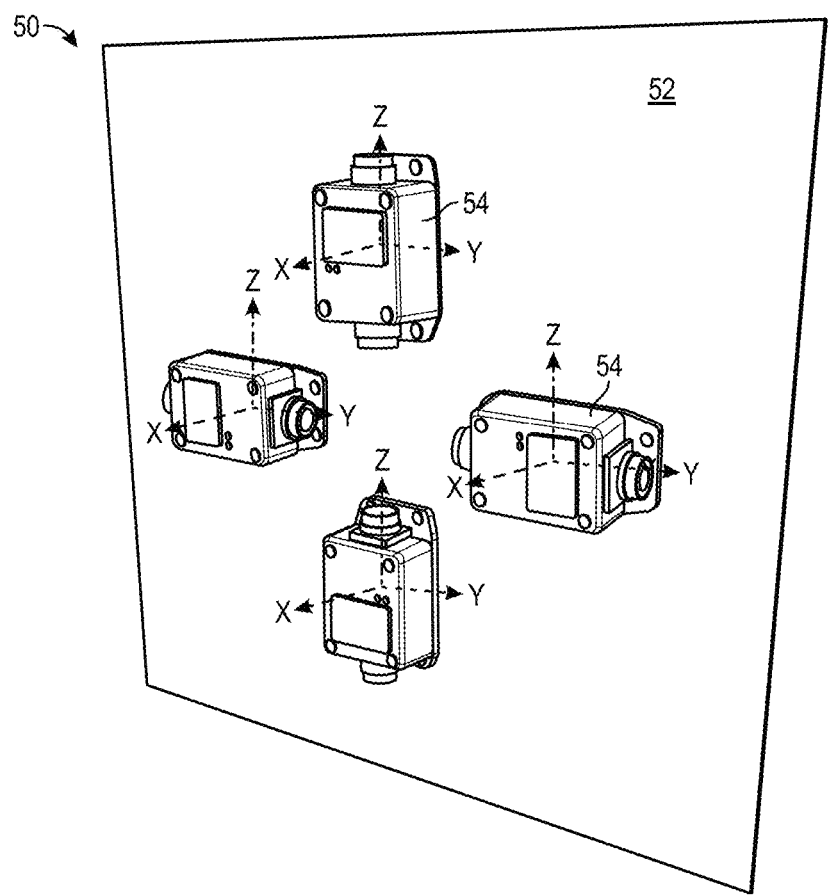
FIG. 5 illustrates in side perspective view an example orientation sensor arrangement according to one embodiment of the present disclosure.

Transitioning now to FIG. 5, an example orientation sensor arrangement is shown in side perspective view. Building feature 52 can be part of a building or building component formed by 3D printing or another relevant additive process, for example, and can be a wall, ceiling, floor, or other suitable building feature. Each of multiple orientation sensors 54 can be designed to sense automatically changes in the geometry of printed objects over time. In various arrangements, each orientation sensor 54 can quantify changes in the magnitude, speed, and direction of inclination with respect to the building component or feature being measured. For example, angular displacement can be measured by some orientation sensors 54 in two mutually perpendicular planes, such as an angle of pitch and an angle of roll (or heel). Some orientation sensors 54 can be adapted to measure angular displacement in three mutually perpendicular planes, and multiple orientation sensors 54 can be arranged to operate in cooperation for various measurements, as will be readily appreciated.

Orientation sensors can be used in a variety of ways and can provide several advantages. For example, orientation sensors can be used for the geometrical control of extended samples in studying bending effects across 3D printed materials. Such geometrical control can be with respect to materials in a printing studio or other similar environment, and can be used for static and dynamic testing, for example. Orientation sensors can also be used for the control of angular movements of large portions of printed materials under the influence of external loads. Such large portions can include some or all of a ceiling, floor, side wall, back wall, curved wall, and/or other substantial regions of a printed building or building component. In some arrangements, one or more of the orientation sensors can be detachable, such as for maintenance or replacement.

The importance of orientation sensor usage can increase when used for multi-story buildings that include 3D printed components. Orientation sensors can be used, for example, to provide indirect measurements with respect to deformations of span structures, indirect measurements with respect to foundation deformations, and direct measurements of the slopes of a stiffness core of a building or building component. Additional applications and measurements involving the use of orientation sensors can also be implemented, as will be readily appreciated.

Figure 6:
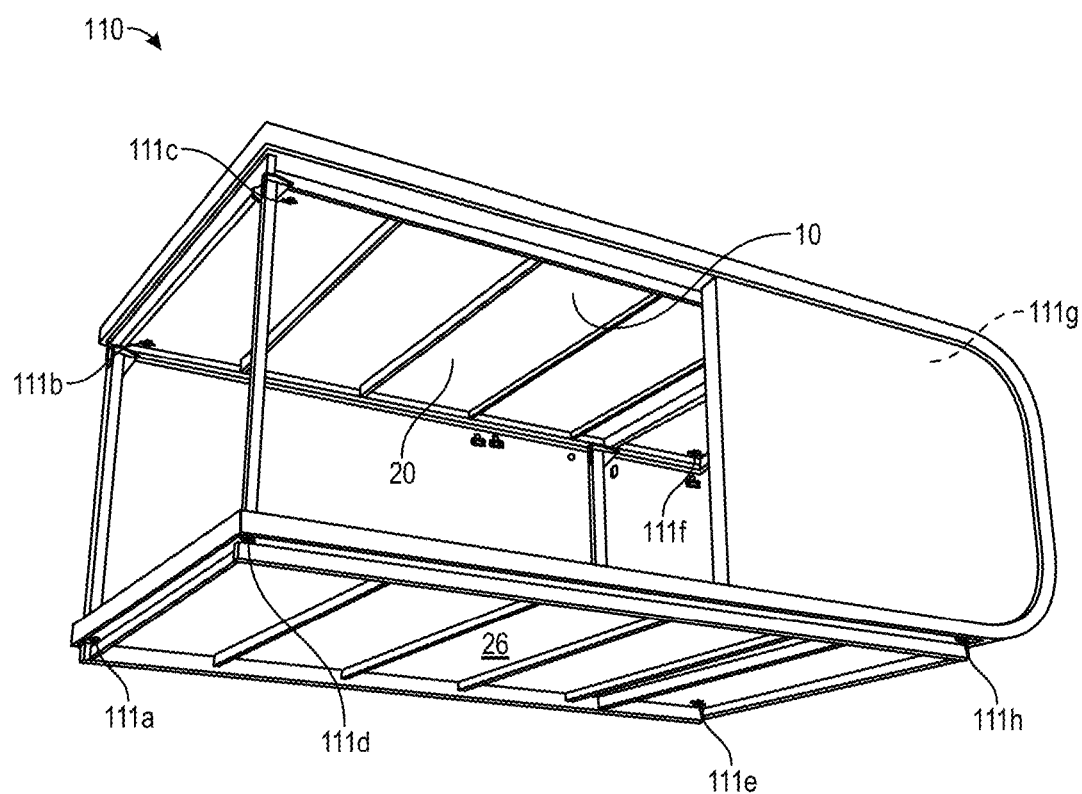
FIG. 6 illustrates a schematic diagram of an example orientation sensing subsystem installed at the 3D printed structure of FIG. 1 as part of an overall structural health monitoring system according to one embodiment of the present disclosure.

FIG. 6 provides a schematic diagram for an example orientation sensing subsystem installed at the 3D printed structure of FIG. 1. Orientation sensing subsystem 110 can be installed at 3D printed structure 10 as be part of an overall structural health monitoring system. Orientation sensing subsystem 110 can include multiple orientation sensors 111a-111h that are installed at a first set of strategic locations. For example, eight orientation sensors can be installed at the four corners of the ceiling 20 and four corners of the floor 26 of 3D printed structure 10. More or fewer orientation sensors may be used, and alternative and/or additional strategic locations can be determined for a given 3D printed building or building component, as will be readily appreciated. In various embodiments, at least some of the orientation sensors can be removable from the structural health monitoring system, such as for purposes of maintenance and/or replacement.

The first set of strategic locations can be determined by modeling structural performance in situations causing different issues. While simulation methods that are commonly used in the construction industry often only identify points with extreme inclinations and displacements where accelerometers and inclinometers should be placed, different modeling approaches can be used for buildings and building components formed by way of additive processes, such as 3D printed structures. These different modeling approaches can determine how a structure formed by an additive process will perform under various loads and where problems are most likely to occur due to the additive nature of the manufactured structure.

Figure 7:
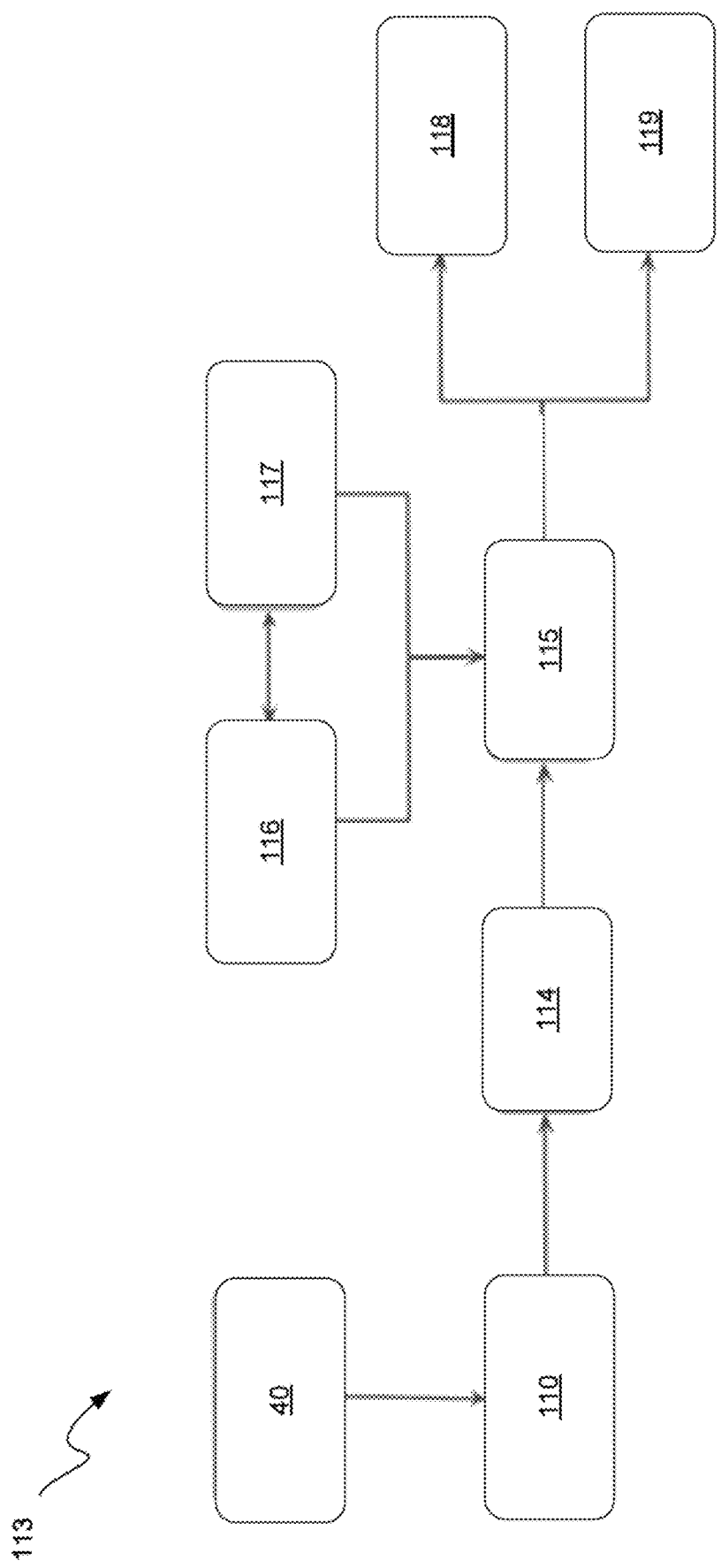
FIG. 7 illustrates a block diagram of an example logic arrangement for an orientation sensing subsystem according to one embodiment of the present disclosure.

Continuing with FIG. 7, a block diagram illustrates an example logic arrangement for an orientation sensing subsystem. Orientation sensing subsystem logic arrangement 113 can include one or more orientation sensors 110 configured to take measurements with respect to a control object 40. Such measurements can include, for example, roll angle and pitch angle, and these measurements can be communicated to a subsystem hub 114. The subsystem hub 114 can communicate the collected roll angles and pitch angles from all orientation sensors to a cloud server 115, which may include or be in communication with a remotely located processing system. A test control object 116 and finite element model of the test control object 117 may also be used to analyze data and communicate results thereof to the cloud server 115. Such results can include critical roll and pitch angle values, for example. The cloud server 115 can then provide results from the analyzed data, such as in the form of alerts, which can be in regular reports 118 and/or can be presented on a front end GUI 119 to a user. Other logic arrangements are also possible.

Strain Sensing Subsystem

Figure 8A:
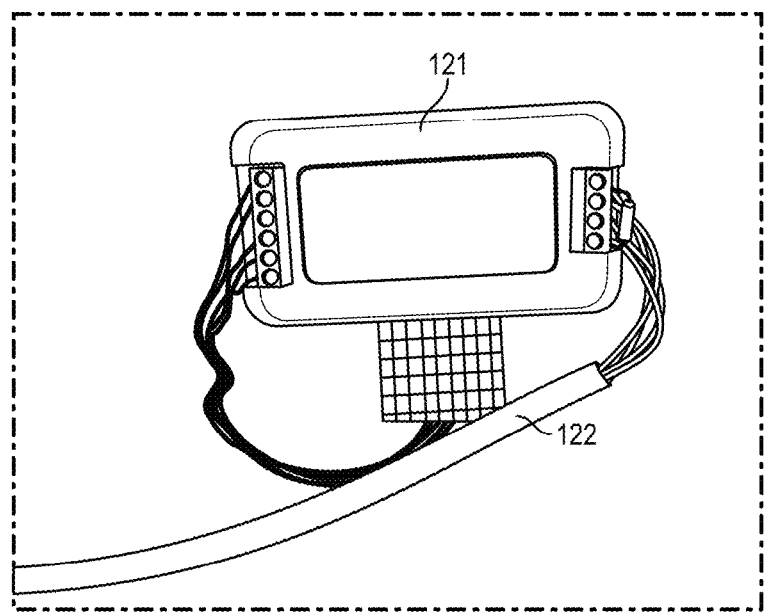
FIG. 8A illustrates in side perspective view a first portion of an example strain gauge installed at a 3D printed structure according to one embodiment of the present disclosure.
Figure 8B:
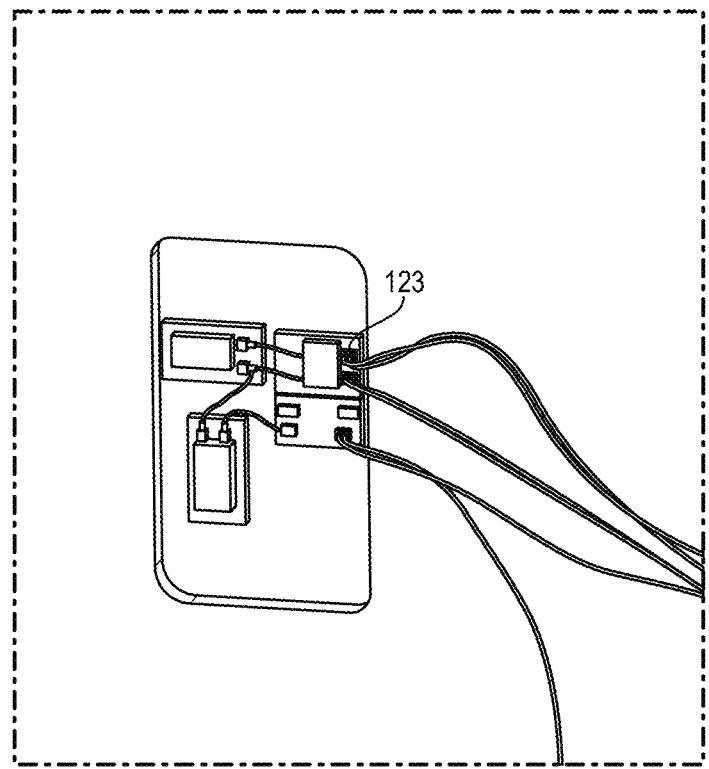
FIG. 8B illustrates in side perspective view a second portion of an example strain gauge installed at a 3D printed structure according to one embodiment of the present disclosure.

Additional sensing subsystems may also be possible within an overall structural health monitoring system. For example, another subsystem can involve a strain sensing subsystem that includes multiple strain gauges located at the same building or building components having an orientation sensing subsystem. FIG. 8A illustrates in side perspective view a first portion of an example strain gauge installed at a 3D printed structure, while FIG. 8B illustrates in side perspective view a second portion of an example strain gauge installed at the 3D printed structure. Strain gauge 121 can be coupled by way of strain gauge wiring 122 to a strain sensing processor 123, all of which can be installed at a relevant 3D printed building or building component. Multiple strain gauges 121 can be installed at various building locations. In some arrangements, one or more of the strain gauges can be detachable, such as for maintenance or replacement.

Figure 9:
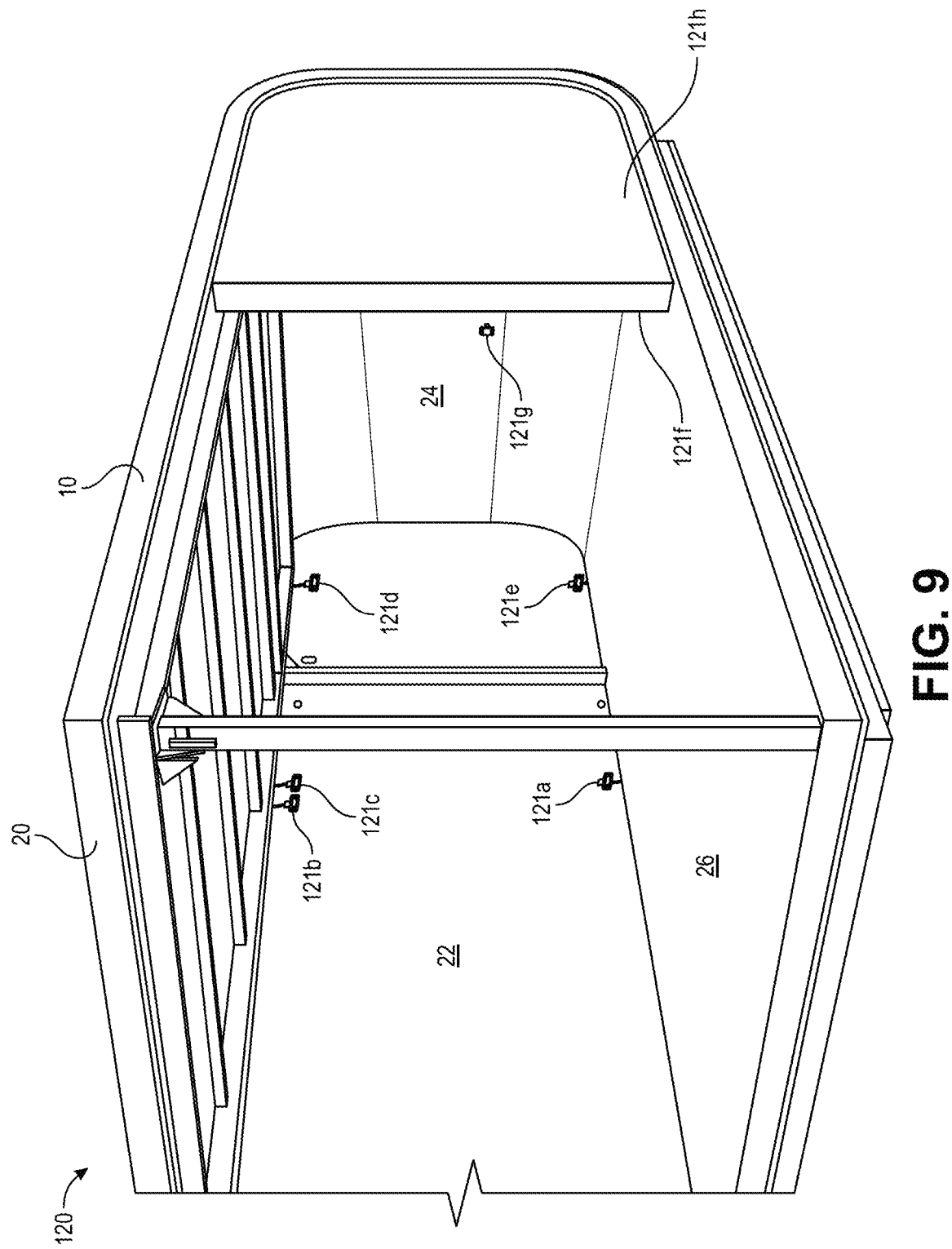
FIG. 9 illustrates a schematic diagram of an example strain sensing subsystem installed at the 3D printed structure of FIG. 1 as part of an overall structural health monitoring system according to one embodiment of the present disclosure.

FIG. 9 provides a schematic diagram of an example strain sensing subsystem installed at the 3D printed structure of FIG. 1 as part of an overall structural health monitoring system. Similar to the example arrangement shown in FIG. 6, strain sensing subsystem 120 can include multiple strain gauges 121a-121h that are installed at another set of strategic locations. This second or other set of strategic locations can be separate from the first set of strategic locations for placing the orientation sensors above. In some arrangements, one or more locations from the first set of strategic locations for orientation sensors can also be used for the second set of strategic locations for strain gauges. In other arrangements, the second set of strategic locations can be completely different from the first set of strategic locations. In one example, eight strain gauges can be installed at critical locations along the ceiling, floor, and/or walls of 3D printed structure 10. More or fewer strain gauges may be used, and alternative and/or additional strategic locations for installation or placement of strain gauges can be determined for a given 3D printed building or building component, as will be readily appreciated. In various embodiments, at least some of the strain gauge sensors can be removable from the structural health monitoring system, such as for purposes of maintenance and/or replacement.

Localized System

In various arrangements, an overall structural health monitoring system can have a localized system installed at the building being monitored as well as a remotely located portion that can be in communication with the localized system. As will be readily appreciated, the remotely located system portion can have greater processing, data analyzing, storage, and user interface capabilities, while the localized system can be streamlined to provide that which is necessary for sensing and basic processing of sensor measurements before forwarding data to the remotely located system portion.

Figure 10:
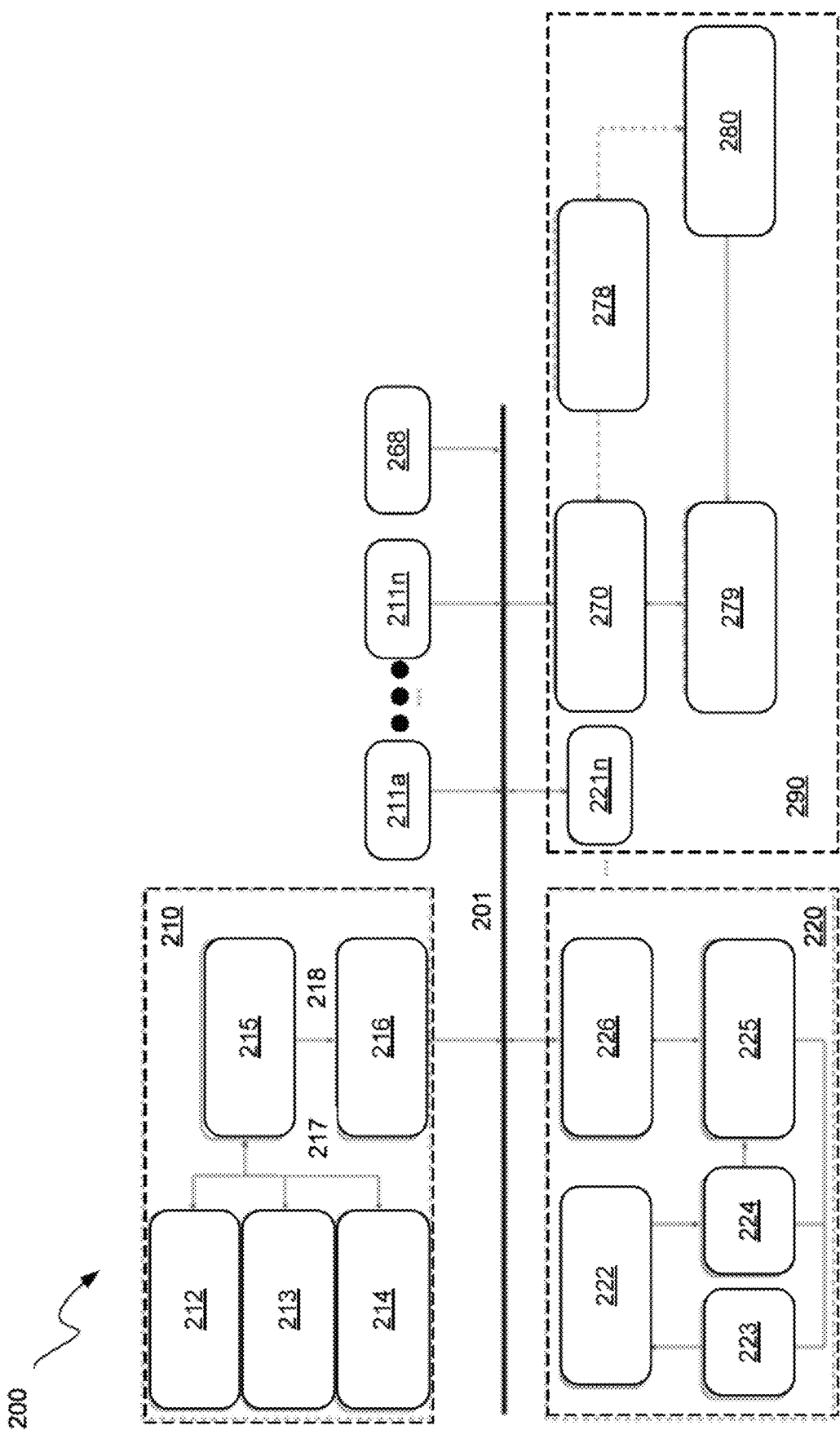
FIG. 10 illustrates a block diagram of an example functional arrangement for a localized system of an overall structural health monitoring system having an orientation sensing subsystem, a strain sensing subsystem, and additional sensors according to one embodiment of the present disclosure.

Moving next to FIG. 10, a block diagram depicts an example functional arrangement for a localized system of an overall structural health monitoring system having an orientation sensing subsystem, a strain sensing subsystem, and additional sensors. In the example provided here for purposes of illustration, alternative structural health and monitoring system 200 can have an orientation sensing subsystem 210, a strain sensing subsystem 220, various added sensors such as environmental sensor 268, and a localized processing and communications subsystem 290. In various embodiments, one or more tensometers can also be used, with such sensor(s) being configured to measure and allow for analysis involving the amount of deformation of the monitored printed material. For example, the one or more tensometers can be calibrated to provide an electrical signal that can be converted to reflect an amount of material deformation.

Orientation sensing subsystem 210 can include, for example, one or more three-axis accelerometers 212, one or more three-axis inclinometers 213, and one or more additional temperature sensors 214. These sensors can be coupled to an orientation sensing subsystem master control unit 215 by way of serial peripheral interface connections 217, for example, and the orientation sensing subsystem master control unit 215 can be coupled to an orientation sensing subsystem interfaces converter 216 by way of a universal asynchronous receiver/transmitter connection 218, for example. The interfaces converter can be coupled to an overall system bus 201 which can be, for example, an RS-485 bus.

Strain sensing subsystem 220 can include, for example, a strain bridge 222 coupled to a driver 223 and an ADC 224, both of which can be coupled to a strain sensing subsystem master control unit 225, which in turn can be coupled to a strain sensing subsystem interfaces converter 226. The strain sensing subsystem interfaces converter 226 can also be coupled to the overall system bus 201. Orientation sensors 211a-211n, and one or more strain gauges 221n can also be coupled to the overall system bus 201, such that these sensors are in communication with their respective sensing subsystems.

A localized CPU board 270 can be a single board controller hub, which can also couple to the overall system bus 201. The localized CPU board 270 can be coupled to a local router 278 and/or a local wireless modem 279, both of which can be in communication with a remotely located cloud server 280. Other connection arrangements are also possible. The localized CPU board 270 can serve as a local processing hub that provides functions such as sensor network management, data collection from sensors, preliminary filtering of the collected data, and formatting of the collected and filtered data into arrays convenient for processing, and then communicating this data to the remotely located cloud server 280. Data transfer to the remotely located cloud server can be via WiFi using the local router 278 and/or by 3G or 4G using the local wireless modem. Again, data can be locally stored for later transfer to a remote or locally attachable analysis system.

In various embodiments, the disclosed systems might be equipped with long-range wireless transmitters, and one or more data processing modules can be installed remotely for remote data analysis. Sensors and multisensor devices can be equipped with batteries, in some arrangements, and can be configured to transmit data only in the event of measured values being out of a predetermined threshold. In some arrangements, various system sensors and multisensor devices might perform simple data analysis locally to detect anomalies based on the data from the sensor. As such, some systems might be configured to perform data analysis on-site to detect anomalies in data from all sensors. In some arrangements, the disclosed systems and methods can include additional sensors configured to measure tensile strengths or tension between printed layers of a 3D printed structure. This can help to identify issues related to the additive nature of both smaller and large scale 3D printed structures and building modules.

Data from the various system sensors can be analyzed to measure structural performance and identify issues in the additive structure of the monitored building or building component. This can involve, for example, comparing a current state to a boundary state, which can represent one or more failure conditions. Accordingly, a boundary state can include many values that represent structural performance simulated in extreme load conditions and in situations with expected structural failures of the monitored 3D printed structure.

Figure 11:
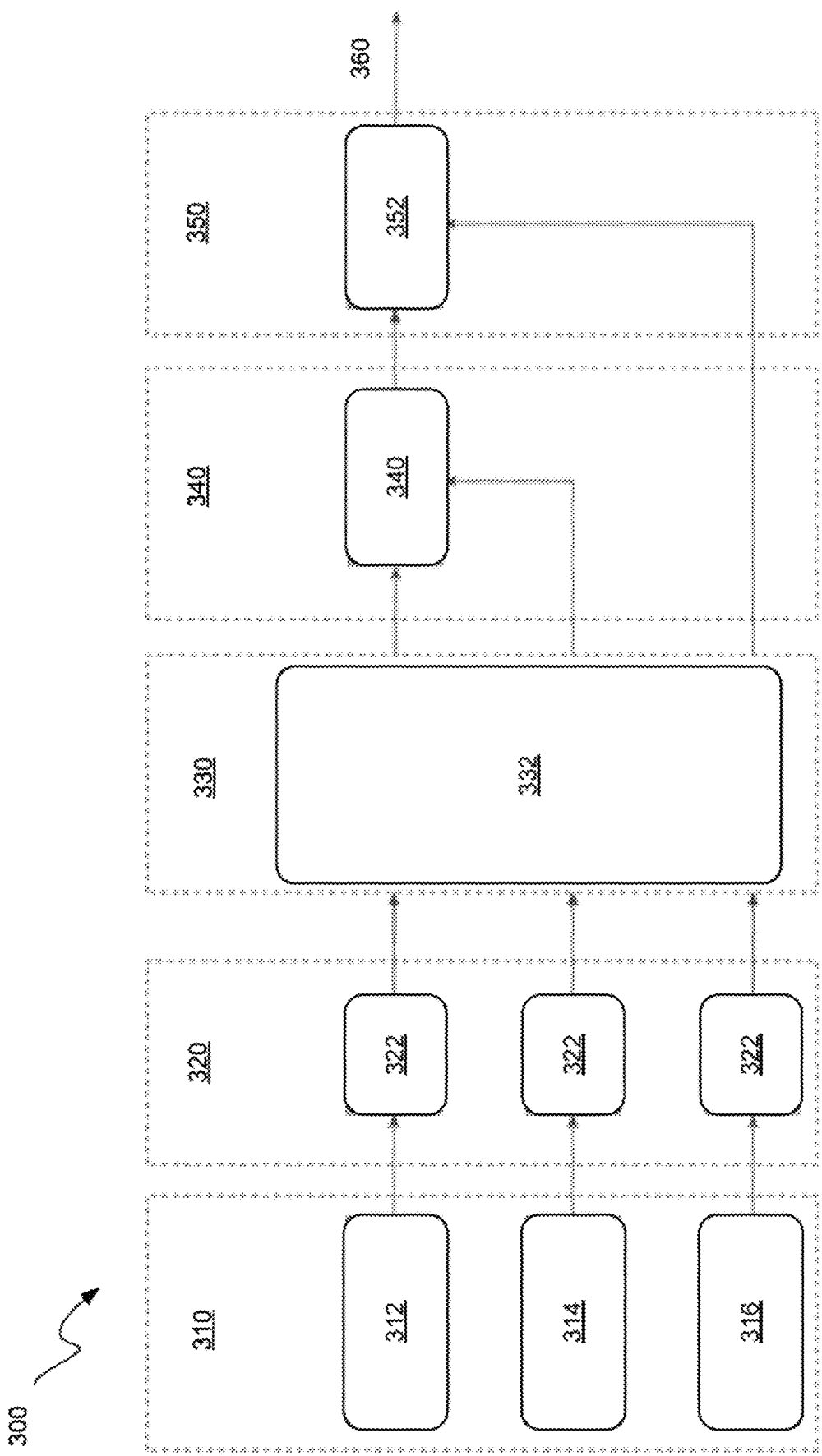
FIG. 11 illustrates a timing diagram of an example data processing flow for an overall structural health monitoring system according to one embodiment of the present disclosure.

FIG. 11 illustrates a timing diagram of an example data processing flow for an overall structural health monitoring system. Data process flow 300 can include multiple stages, such as data gathering 310, noise filtering 320, prefiltering 330, value extraction 340, complex data analysis 350, and results 360. Data gathering 310 can include collecting data from the various system sensors, which can include, for example, accelerometer data 312, gyroscope data 314, and tensor data 316, among other types of sensor data. Noise filtering 320 can include filtering unwanted high frequency noise, such as by passing the collected sensor data through one or more low pass noise filters 322.

Prefiltering 330 can include digital signal process filtering that can be performed by a prefiltering processor 332, which can be located locally at the monitored structure. Various functions performed by the prefiltering processor 332 can include, for example, bypass filtering, averaging, moving averages, digital low pass filtering, digital bandpass filtering, various math and logic integrations, Savitzky-Golay digital filtering, discrete Fourier transforms, and/or other suitable prefiltering processes.

Value extraction 340 can include processing algorithms that may also be performed locally by a local processor 342 at the monitored structure. In some arrangements, local processor 342 can be the same processor as the prefiltering processor 332 performing prefiltering 330 above. Various value extraction 340 processing algorithms can include, for example, sensor orientation, sensor acceleration, and applied forces. The local processor 342 can then communicate the value extracted data to a remotely located processing system for additional data processing and analysis.

Complex data analyzing 350 can be performed at a remotely located processing system 352. This can include, for example, sensor data comparison to predefined extreme levels of dynamic load and displacement analysis taking into account data from other sensors. Results 360 can then be provided from the complex data analyzing 350 performed at the remotely located processing system 352.

Simulation Engine

In the foregoing embodiments involving overall structural health monitoring systems and the various subsystems and components thereof, one or more of the system sensors might be installed into the structure after or during the process of printing the subject printed building components. Sensors may be embedded within the printed material and/or may be placed on various printed material surfaces. As will be readily appreciated, it can be preferable to place some or all of the various system sensors at optimal or at least strategic locations on the printed building components. Such optimal or strategic locations for sensor placement can be based on initial design and accuracy requirements, as well as modeling and/or actual laboratory test results. In this regard, one or more modeling and analysis processes can be performed prior to sensor installation, such that various sets of strategic locations for sensor placements on the building component(s) can be predetermined.

Structural load modeling of 3D printed structures using finite-element analysis and small-scale laboratory tests can be used to identify the structural points of maximum and critical (i.e., failure) angular displacements. Based on the modeling data, acceptable limits for the angular displacements of critical points of the structure can be established.

During operation of the fully-printed structure, the angular displacements of critical points of the structure can be continuously monitored at these critical points or strategic locations, and all angular displacements can be located within acceptable limits.

During laboratory tests, the structural points with the maximum stresses arising under the influence of gravity and external stress factors, as well as critical stress values at which structural failure occurs, can be established by modeling behaviors of studio construction using finite-element analysis and field experiments. Based on the modeled data, permissible stress limits of critical points of the structure can be established. During operation of the studio construction, continuous monitoring of stresses at critical points of the structure can be conducted and the finding of all stresses within acceptable limits can be monitored.

Where possible, 3D printed structures can preferably be designed in geometries to avoid manufacturing deformations. Another way to achieve favorable performance in a printed structure is by designing a compensation geometry. With compensation geometry, the initial model of the structure can be designed in such a way that deformations during the printing process are going to change the structure to achieve the required dimensional accuracy of the structure. Such methods can cause post printing deformations due to external loads, however, which issues can be monitored with the structural health monitoring systems disclosed herein. Again, the various structural health monitoring system sensors can be placed at strategic locations, such as in the areas where compensation geometry is proposed by an engineer or is determined during design, modeling, and testing stages. Strategic sensor location placements for these and other bases can then enhance the output quality of an actual 3D printed product.

Figure 12:
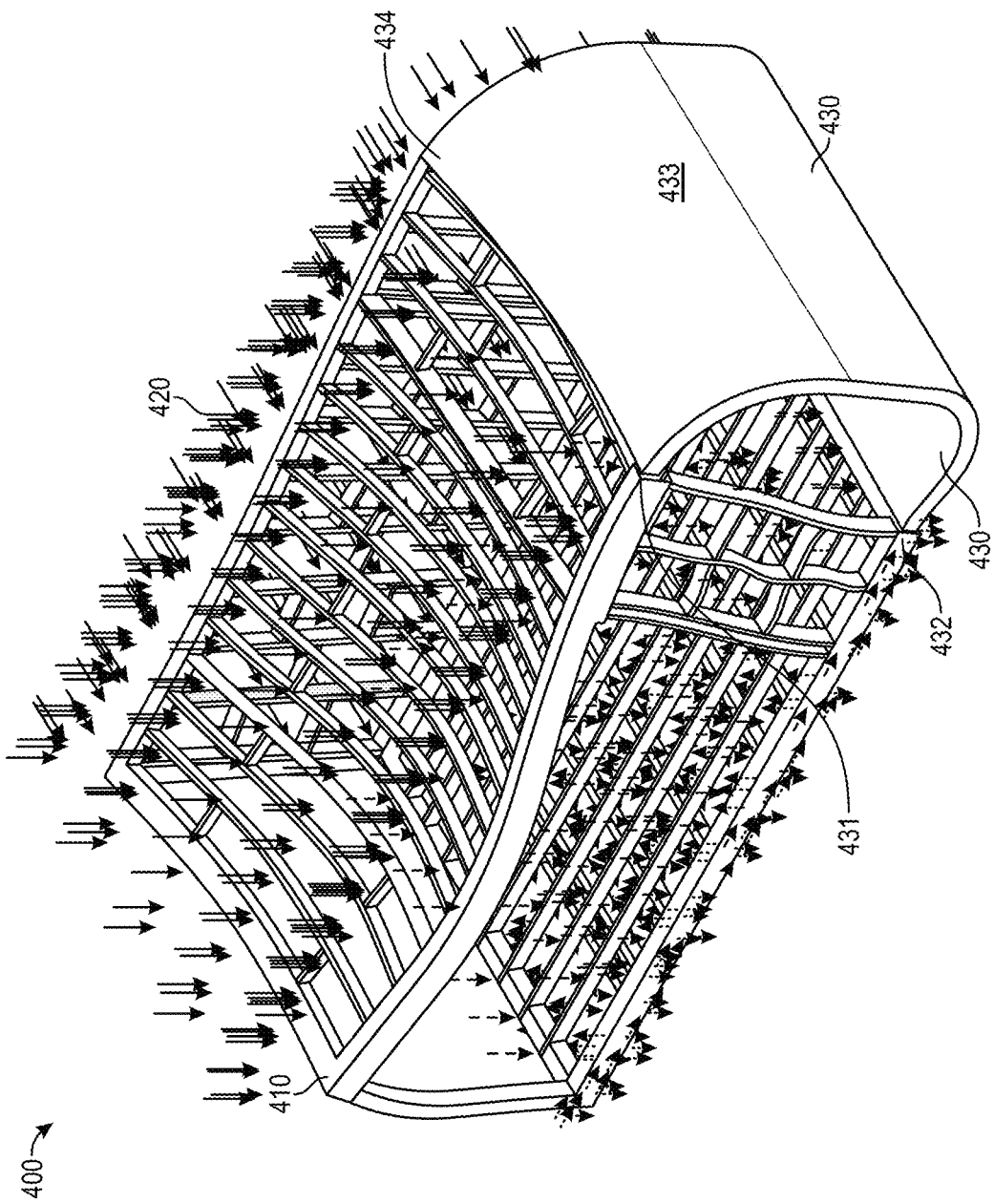
FIG. 12 illustrates in rear perspective view an example model reflecting the structural performance of the 3D printed structure of FIG. 1 under applied loads and identified strategic locations on the model according to one embodiment of the present disclosure.

FIG. 12 illustrates in rear perspective view an example model reflecting the structural performance of the 3D printed structure of FIG. 1 under applied loads and identified strategic locations on the model. Simulation model 400 reflects the expected structural performance of the 3D printed structure of FIG. 1 in a preproduction analysis. In particular, modeling analysis can focus on the proposed curved back wall portion of the 3D printed structure of FIG. 1. Simulation model 400 was created by modeling in ANSYS engineering modeling software to identify extreme inclination and displacement of the subject printed structure with a curved back wall portion. Simulated structure 410 can have various expected loads 420 applied to it across the simulated structure. Based on this simulation, four points 430 are identified as places on the structure where extreme loads are most likely to cause structural damage or failure. These four points 430 can then represent a set of strategic locations 431-434 where sensors should be located to measure structural health of the actual building facing extreme loads.

Of course, it will be readily appreciated that the foregoing example is just one possible design for a 3D printed building or building component. The disclosed design, modeling, and studio testing techniques can be similarly performed with respect to a wide variety of different 3D printed building designs or proposed designs, and such designs can be significantly more complex than the examples provided herein. In addition, as 3D printing enables manufacturing of structures consisting of similar building components and modules by design and geometries, the disclosed systems, subsystems, components, and methodologies can be used to provide data to build better classification models to interpret data, which might then be used during the design stage of new and different structures.

Figure 13:
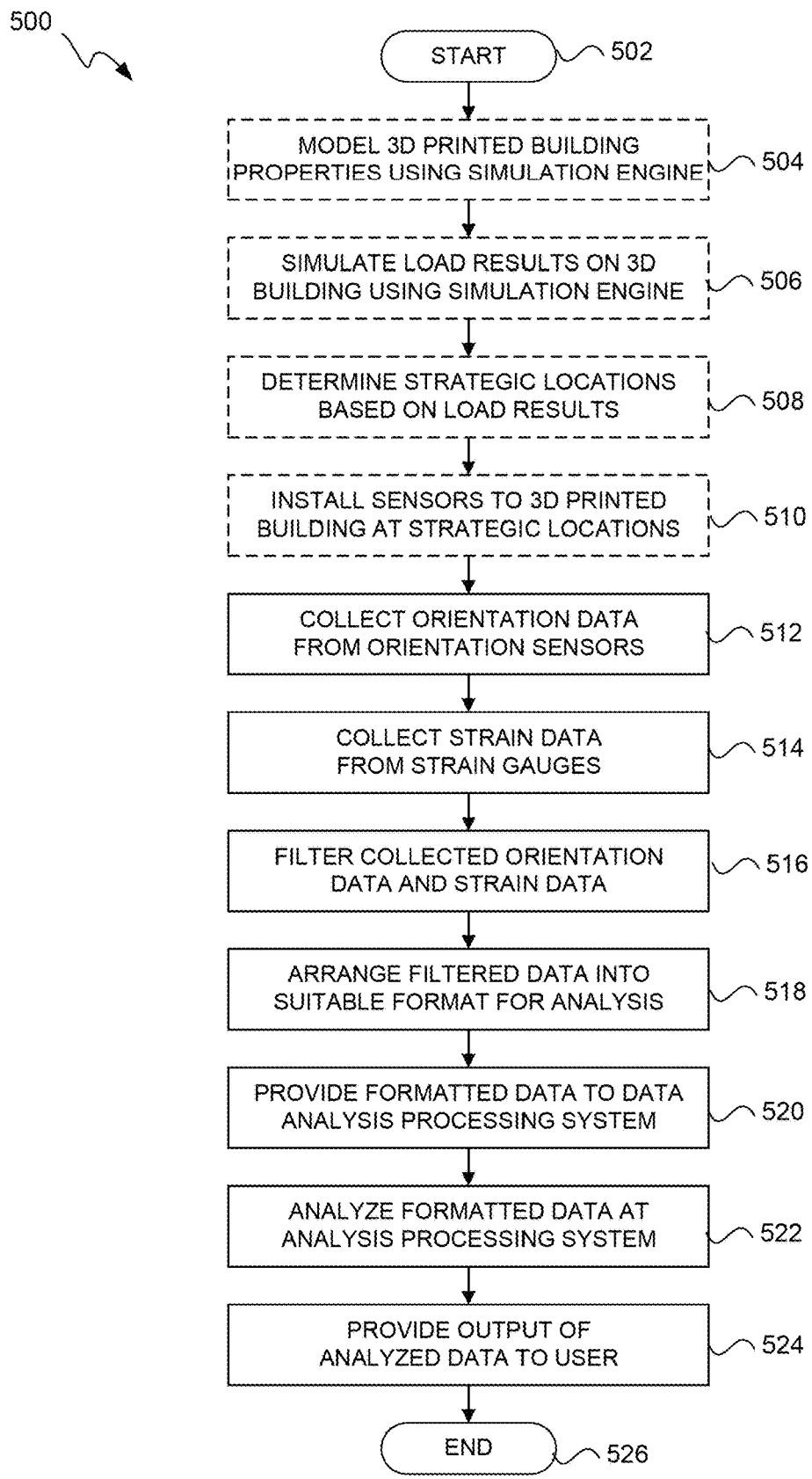
FIG. 13 illustrates a flowchart of a method of monitoring the structural health of a building component formed by an additive process according to one embodiment of the present disclosure.

Lastly, FIG. 13 provides a flowchart of an example method of monitoring the structural health of a building component formed by an additive process. The additive process can be a 3D printing process, for example. While method 500 can be specifically directed to various processes involving the specific systems and components shown and described with respect to FIGS. 1-12 above, it will be readily appreciated that many of the provided steps and details may be similarly applied to other buildings, building components, systems, and/or system components. Other steps may be added, and some steps may be modified or adjusted with respect to other building components and system components as may be applicable. Although various steps in example method 500 may be performed manually, it will be understood that some or all of these steps may also be automated in some arrangements.

After a start step 502, initial process steps 504-510 can be optional in some methods. For example, some methods may only apply to sensors and systems that have already been installed, such that steps 504-510 are not necessary in such cases. This can apply for methods involving already installed systems, for example, where modeling and system installation is performed by one party and data collection, analysis, and output are performed by another party.

At a first optional process step 504, the three-dimensional geometry and material properties of a relevant building or building component can be modeled using a simulation engine. This can involve, for example, the simulation engine and related processes described above with respect to FIG. 12.

At a following optional process step 506, a simulation engine can be used to simulate results from the application of various loads on the modeled 3D building or building component. This can involve simulating expected and anticipated loads due to building component transport, installation, and/or use after installation. Such loads can include, for example, weights and forces experienced during transport and installation, weights and forces experienced from occupants and typically used items after installation during ordinary building use, and/or expansion, contraction, wear, and other forces experienced during ordinary temperature and humidity cycling.

At subsequent optional process step 508, the simulation engine and/or another analysis component can be used to determine strategic locations based on the simulated results from the simulation engine. These strategic locations can indicate optimal locations for placing one or more sensors and can include multiple sets of strategic locations. Strategic locations can include, for example, a first set of strategic locations for the locations of orientation sensors, a second set of strategic locations for the locations of strain gauges, and/or other strategic locations for additional sensors, such as temperature sensors, humidity sensors, tensometers, and the like.

At the next optional process step 510, sensors can be installed at the determined strategic locations on the actual building or building component that has been modeled. Such installations can be conducted during the formation of a 3D printed building component, for example, such as in the case of embedded sensors. Alternatively, or in addition, one or more sensors can be installed after formation of the 3D printed building or building component. For example, temperature and/or humidity sensors can be installed after building formation to an outer surface of the 3D printed building or building component to measure ambient temperature and humidity at one or more locations inside and/or outside of the building.

At process step 512, orientation data can be collected from one or more orientation sensors installed at the building or building component. This can involve, for example, collecting orientation data from some or all orientation sensors in an orientation sensing subsystem that is part of an overall structural health monitoring system. The orientation sensors can be those located at a first set of strategic locations on a building component formed by an additive process, and/or can be one or more additional orientation sensors placed at locations that were not determined to be strategic locations. Orientation data can be collected at regular time intervals, and/or upon a triggering event such as a sudden change in conditions measured by any other sensor in the overall system. In some embodiments, orientation data can be collected continuously on an ongoing automated basis.

At process step 514, strain data can be collected from one or more strain gauges installed at the building or building component. This can involve, for example, collecting strain data from some or all strain gauges in a strain sensing subsystem that is part of an overall structural health monitoring system. The strain gauges can be those located at a second set of strategic locations on a building component formed by an additive process, and/or can be one or more additional strain gauges placed at locations that were not determined to be strategic locations. Strain data can be collected at regular time intervals, and/or upon a triggering event such as a sudden change in conditions measured by any other sensor in the overall system. In some embodiments, strain data can be collected continuously on an ongoing automated basis.

At a subsequent process step 516, the collected orientation data and strain data can be filtered, which can be done automatically by a processor. Data can be filtered, for example, to exclude data items or readings that are repetitive or are unlikely to be relevant in performing later data analysis. Various factors can be programmed into an automated filtering process to exclude such data and excluded data may be recorded in the event that such data may be useful later.

At the next process step 518, the filtered data can be arranged into a format suitable for data analysis, which can also be done automatically by a processor. The filtered data can be arranged into tabular or other formats with associated tags for the various data items that allow for the ready processing and analysis by a separate data analysis processing system. In various embodiments, process steps 512-518 can be performed locally by structural health monitoring system components and processors that are at the relevant building or building component.

At the following process step 520, the formatted data can be provided to a separate data analysis processing system, which can also be done automatically by a processor. This can involve, for example, a local processor at the relevant building or building component communicating the formatted data to a remotely located data analysis processing system. By separating automated functions in this manner, the system components and processors located at the monitored building or building component can be kept relatively simple, while any substantial processing and analysis can be performed remotely by a larger and more complex system. This can also provide the advantage of allowing a remotely located and more complex system to process and analyze data for many localized monitoring systems, as well as to manage updates, alerts, and data storage at the larger and more complex remotely located system portion.

At the next process step 522, the formatted data received by the remotely located analysis processing system can then be analyzed at the analysis processing system, which can also be done automatically by one or more processors. This can involve analyzing the formatted data for issues relating to structural failure of the building component, as well as for other conditions that may signal or lead to structural failure for any monitored reason. Results of the analysis can be stored for future reference, and stored results can be analyzed over time to determine trends and potential problematic issues. Automated alerts can be issued in the event that any significant analysis results or trending issues arise.

At process step 524, output of the analyzed data can be provided to a system user. The system user can be a customer or subscriber of the system, such as an owner of an individual monitored building. Alternatively, or in addition, the system user can be personnel of the overall system owner, such as a service provider that runs the remote analysis processing system for many system customers or subscribers. The output provided to the system user can be an automated output, such as a regular interval report or an alert issued when a significant result occurs in the analyzed data. Alternatively, or in addition, the provided output can be an output generated at the request of a system user regarding one or more parameters input by the user.

The method then ends at end step 526, although it will be appreciated that the method may be repeated if desired. For example, steps 512-524 may be repeated on an ongoing basis. For the foregoing flowchart, it will be readily appreciated that not every method step provided is always necessary, and that further steps not set forth herein may also be included. For example, added steps can involve adjusting modeled building properties, repeating modeling for the adjustments, collecting, filtering, and formatting data from additional sensor types, and/or providing automated alerts when certain thresholds are reached or exceeded in the collected or analyzed data, among other possible steps. Furthermore, the order of steps may be altered as desired, and some steps may be performed simultaneously. For example, step 512 may alternatively be performed after step 514, and/or step 518 may be performed after step 520. Also, steps 512-516 can be performed simultaneously in some embodiments. Not all steps are always necessary either. For example, step 524 may not be performed in all embodiments, such as where automated alerts are provided whenever collected or analyzed data exceeds certain preset thresholds.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A structural health monitoring system configured to monitor the structural health of a residential or commercial building component, comprising:
   an orientation sensing subsystem including an orientation data processor coupled to a plurality of orientation sensors and an orientation subsystem interface, wherein the plurality of orientation sensors is located at and collect orientation data from a first set of strategic locations on a residential or commercial building component formed by a three-dimensional printing process;

a strain sensing subsystem including a strain data processor coupled to a plurality of strain gauges and a strain subsystem interface, wherein the plurality of strain gauges is located at and collect strain data from a second set of strategic locations on the building component;

an environmental subsystem including an environmental data processor coupled to one or more environmental sensors and an environmental subsystem interface, wherein the one or more environmental sensors collect humidity and temperature data at the building component;

one or more tensometers located at and providing tensile data regarding material deformations at a third set of strategic locations on the building component, wherein the first set of strategic locations, the second set of strategic locations, and the third set of strategic locations are determined using a simulation engine configured to determine likely structural failure locations of the building component by modeling the three-dimensional geometry and material properties of the building component and simulating results from the application of various loads on the building component; and a local central processor located at or proximate the building component and coupled to the orientation subsystem interface, the strain subsystem interface, the environmental subsystem interface, and the one or more tensometers, wherein the local central processor is configured to receive data from the orientation data processor, the strain data processor, the environmental data processor, and the one or more tensometers, filter the received data, arrange the filtered data into a format for data analysis, and provide the formatted data to a remotely located processing system for data analysis regarding issues relating to structural failure of the building component, structural changes of the building component, and/or the three-dimensional printed nature of the building component, and wherein the structural health monitoring system is configured to monitor and track structural changes of the building component during production of the building component, while the building component is being transported to a building location, and after final installation of the building component.

2. The structural health monitoring system of claim 1, wherein the remotely located processing system is configured to analyze the formatted data for issues relating to structural failure of the building component and provide an output to a user regarding the analyzed data.

3. The structural health monitoring system of claim 2, further including:
the remotely located processing system.

4. The structural health monitoring system of claim 1, wherein the first set of strategic locations and the second set of strategic locations are determined using a simulation engine configured to determine likely structural failure locations of the building component by modeling the three-dimensional geometry and material properties of the building component and simulating results from the application of various loads on the building component.

5. The structural health monitoring system of claim 4, wherein the first set of strategic locations are where orientations of the building component are most likely to change and the second set of strategic locations are where the greatest amounts of strain are most likely to be experienced due to future application of actual loads on the building component.

6. The structural health monitoring system of claim 5, further including:
the simulation engine.

7. The structural health monitoring system of claim 1, wherein at least some of the plurality of orientation sensors and the plurality of strain gauge sensors are embedded within three-dimensional printed material of the building component.

8. The structural health monitoring system of claim 1, wherein at least some of the plurality of orientation sensors and the plurality of strain gauge sensors are located at the building component after three-dimensional printing of the building component.

9. The structural health monitoring system of claim 8, wherein three-dimensional printing of the building component includes providing one or more recesses within the three-dimensional printed material for placement of one or more of the orientation sensors and strain gauge sensors.

10. The structural health monitoring system of claim 9, wherein at least some of the plurality of orientation sensors and the plurality of strain gauge sensors are removable from the structural health monitoring system.

11. The structural health monitoring system of claim 1, further including:
an environmental subsystem including an environmental processor coupled to one or more environmental sensors and an environmental subsystem interface, wherein the one or more environmental sensors collect humidity and temperature data at the building component and the environmental processor provides the humidity and temperature data to the local central processor via the environmental subsystem interface.

12. The structural health monitoring system of claim 1, further including:
one or more tensometers located at a third set of strategic locations on the building component, wherein the one or more tensometers provide tensile data to the local central processor relating to material deformation at the third set of strategic locations.

13. The structural health monitoring system of claim 1, wherein the formatted data is provided to the remotely located processing system while the building component is being transported to a building location.

14. The structural health monitoring system of claim 13, wherein additional formatted data is provided to the remotely located processing system while the building component is installed at the building location after being transported to the building location.

15. The structural health monitoring system of claim 1, wherein the formatted data is temporarily stored by the local central processor for future provision to the remotely located processing system or a separate connectable processing system at a building location before installation of the building component at the building location.

16. The structural health monitoring system of claim 1, wherein the formatted data is temporarily stored by the local central processor for future provision to the remotely located processing system or a separate connectable processing system at a location after formation of the building component and before transport of the building component to a building location for installation.

17. The structural health monitoring system of claim 1, wherein the building component is a residential or commercial building component that includes at least a ceiling, one or more straight wall portions, a curved wall portion, and a floor that are all formed by a three-dimensional printing process.

18. The structural health monitoring system of claim 1, wherein the first set of strategic locations include one or more floor corners, one or more ceiling corners, or both.

19. A method of monitoring the structural health of a residential or commercial building component formed by a three-dimensional printing process, the method comprising:
    collecting orientation data from a plurality of orientation sensors located at a first set of strategic locations on a residential or commercial building component formed by a three-dimensional printing process during production of the building component, while the building component is being transported to a building location, and after final installation of the building component;
    collecting strain data from a plurality of strain gauges located at a second set of strategic locations on the building component during production of the building component, while the building component is being transported to a building location, and after final installation of the building component;
    filtering automatically by a processor the collected orientation data and strain data;
    arranging automatically by a processor the filtered data into a format for data analysis;
    providing the formatted data to a data analysis processing system;
    analyzing automatically by the data analysis processing system the formatted data for issues relating to structural failure of the building component, structural changes of the building component, and/or the three-dimensional printed nature of the building component; and
    providing to a user an output regarding the analyzed data.

20. The method of claim 19, further comprising the steps of:
    collecting environmental data from a plurality of humidity and temperature sensors located on the building component;
    providing the environmental data to the data analysis processing system; and
    analyzing automatically by the data analysis processing system the environmental data for issues relating to structural performance of the building component due to cyclic deformation and environmental changes determined from the environmental data.

21. The method of claim 19, further comprising the steps of:
    collecting tensile data from a plurality of tensometers sensors located at a third set of strategic locations on the building component;
    providing the tensile data to the data analysis processing system; and
    analyzing automatically by the data analysis processing system the tensile data for issues relating to structural performance of the building component due to material deformations determined from the tensile data.

22. The method of claim 19, further comprising the steps of:
    modeling the three-dimensional geometry and material properties of the building component using a simulation engine;
    simulating results from the application of various loads on the building component using the simulation engine; and
    determining the first set of strategic locations and second set of strategic locations based on the simulated results from the simulation engine.

23. The method of claim 19, wherein the first set of strategic locations include one or more floor corners, one or more ceiling corners, or both.

* * * * *